United States Patent [19]

Kawamura et al.

[11] Patent Number: 4,827,446
[45] Date of Patent: May 2, 1989

[54] INTERFACE UNIT FOR CONVERTING FORMAT

[75] Inventors: Hideaki Kawamura, Hachioji; Toshiaki Otsuki, Hino, both of Japan

[73] Assignee: Fanuc Ltd, Minamitsuru, Japan

[21] Appl. No.: 752,103

[22] PCT Filed: Oct. 26, 1984

[86] PCT No.: PCT/JP84/00515
§ 371 Date: Jun. 27, 1985
§ 102(e) Date: Jun. 27, 1985

[87] PCT Pub. No.: WO85/02031
PCT Pub. Date: May 9, 1985

[30] Foreign Application Priority Data

Oct. 27, 1983 [JP]  Japan ................................ 58-201814

[51] Int. Cl.$^4$ ........................ G06F 9/22; G06F 15/46
[52] U.S. Cl. ................................. 364/900; 364/468; 364/921; 364/946.2
[58] Field of Search ... 364/200 MS File, 900 MS File, 364/474

[56] References Cited

U.S. PATENT DOCUMENTS

| | | | |
|---|---|---|---|
| 4,016,540 | 4/1977 | Hyatt | 364/900 |
| 4,038,533 | 7/1977 | Dummermuth et al. | 235/151.11 |
| 4,060,848 | 11/1977 | Hyatt | 364/200 |
| 4,115,853 | 9/1978 | Dummermuth | 364/200 |
| 4,130,869 | 12/1978 | Kinoshita et al. | 364/200 |
| 4,138,718 | 2/1979 | Toke et al. | 364/200 |
| 4,385,349 | 5/1983 | Ashford et al. | 364/184 |
| 4,399,505 | 8/1983 | Druke et al. | 364/200 |
| 4,415,969 | 11/1983 | Bayliss et al. | 364/200 |
| 4,510,565 | 4/1985 | Dummermuth | 364/136 |
| 4,513,379 | 4/1985 | Wilson et al. | 364/474 |
| 4,584,638 | 4/1986 | Akasofu | 364/136 |

Primary Examiner—Gareth D. Shaw
Assistant Examiner—Maria Napiorkowski
Attorney, Agent, or Firm—Staas & Halsey

[57] ABSTRACT

An interface unit simplifies the definition or correction of the contents of conversion from a macro instruction into micro instructions by the machine tool maker, without changing the specifications of the NC processor (3) side in numerical control equipment (NC). A receiving circuit (9, 10) receives a macro instruction delivered from the NC processor (3), and format converting circuitry (6, 8) converts the macro instruction received by the receiving circuit (9, 10) into a series of micro instructions. A transmitting circuit (11, 12) transmits the series of micro instructions obtained by the format converting circuitry (6, 8) to the NC processor (3).

6 Claims, 3 Drawing Sheets

INTERFACE UNIT FOR CONVERTING FORMAT

TECHNICAL FIELD

The present invention relates to an interface unit for numerical control equipment, and more particularly to an interface unit for format conversion which converts a macro instruction into micro instructions.

BACKGROUND ART

Since conventional numerical control equipment (NC) is arranged so that when a group of commands (micro instructions) for performing a certain operation, is made programmable in the form of a single command (a macro instruction), and a program for converting the single command to the group of commands is stored in a ROM or the like of the NC (as is the case with an ordinary cutting program), it is difficult to make the NC versatile. That is to say, the contents of the above conversion program usually differ with machine tools, so it is necessary to modify the specifications of the NC system for each machine tool to which the NC is connected. Furthermore, the situation occasionally arises where it would be desirable, from the standpoint of a machine tool maker, to change the conversion program for their own purposes with a view to presenting their own characteristic feature. However, such a change is not always easy with the prior art numerical control equipment, as mentioned above.

SUMMARY OF THE INVENTION

An object of the present invention is to provide a novel interface unit for format conversion, which converts a macro instruction into micro instructions.

Another object of the present invention is to provide an interface unit format conversion which permits machine tool makers to adopt their own conversion contents while holding the specifications of the NC processor side unified.

The format converting interface unit of the present invention is for numerical control equipment which numerically controls a machine tool by interpreting and executing an NC machining program through use of the operation function of an NC processor. The format converting interface unit comprises a receiving circuit for receiving a macro instruction delivered from the NC processor, format converting means for converting the macro instruction received by the receiving circuit into a series of micro instructions, and a transmitting circuit for transmitting the series of micro instructions obtained by the format converting means to the NC processor.

DETAILED DESCRIPTION OF THE PREFERRED EMBODIMENT

Figure 1:
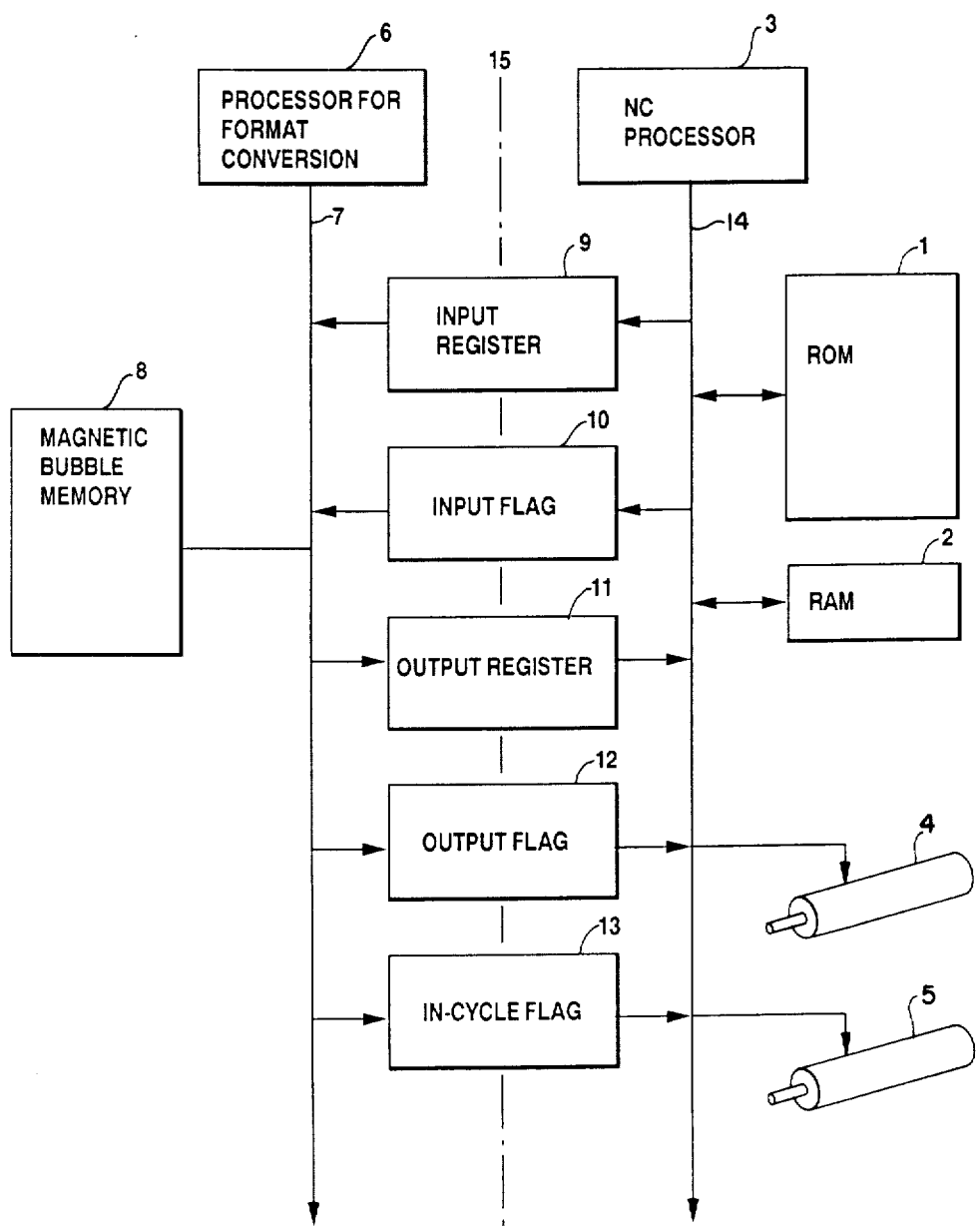
FIG. 1 is a block diagram of the principal part of an example of the hardware construction of numerical control equipment provided with the format converting interface unit of the present invention.

In FIG. 1, reference numeral 1 indicates a ROM for storing a system program, 2 a RAM for storing a machining program, and 3 an NC processor which has its general operation defined by the system program stored in the ROM 1 and which interprets and executes the machining program stored in the RAM 2 to drive servo motors 4 and 5, thereby effecting numerial control of a machine tool (not shown). Reference numeral 6 designates a processor for format conversion, which is connected via a bus 7 to peripheral circuits such as a writable-readable memory, for example, a magnetic bubble memory 8, an input register 9, an input flag 10, an output register 11, an output flag 12 and an in-cycle flag 13. These peripheral circuits are connected via a bus 14 to the NC processor 3. The right-hand side of the one-dot chain line 15 in FIG. 1 is the NC side and the left-hand side is the interface side.

The input register 9 is a register for conveying data from the NC side to the interface side, the input flag 10 is a flag indicating that data has been set in the input register 9, the output register 11 is a register for conveying data from the interface side to the NC side, and the output flag 12 is a flag indicating that the data has been set in the output register 11. The input register 9, the input flag 10, the output register 11 and the output flag 12 are accessible by both the NC processor 3 and the processor 6 for format conversion. The in-cycle flag 13 is a flag indicating that the format conversion is under way, i.e. the conversion cycle is in progress.

Figure 2:
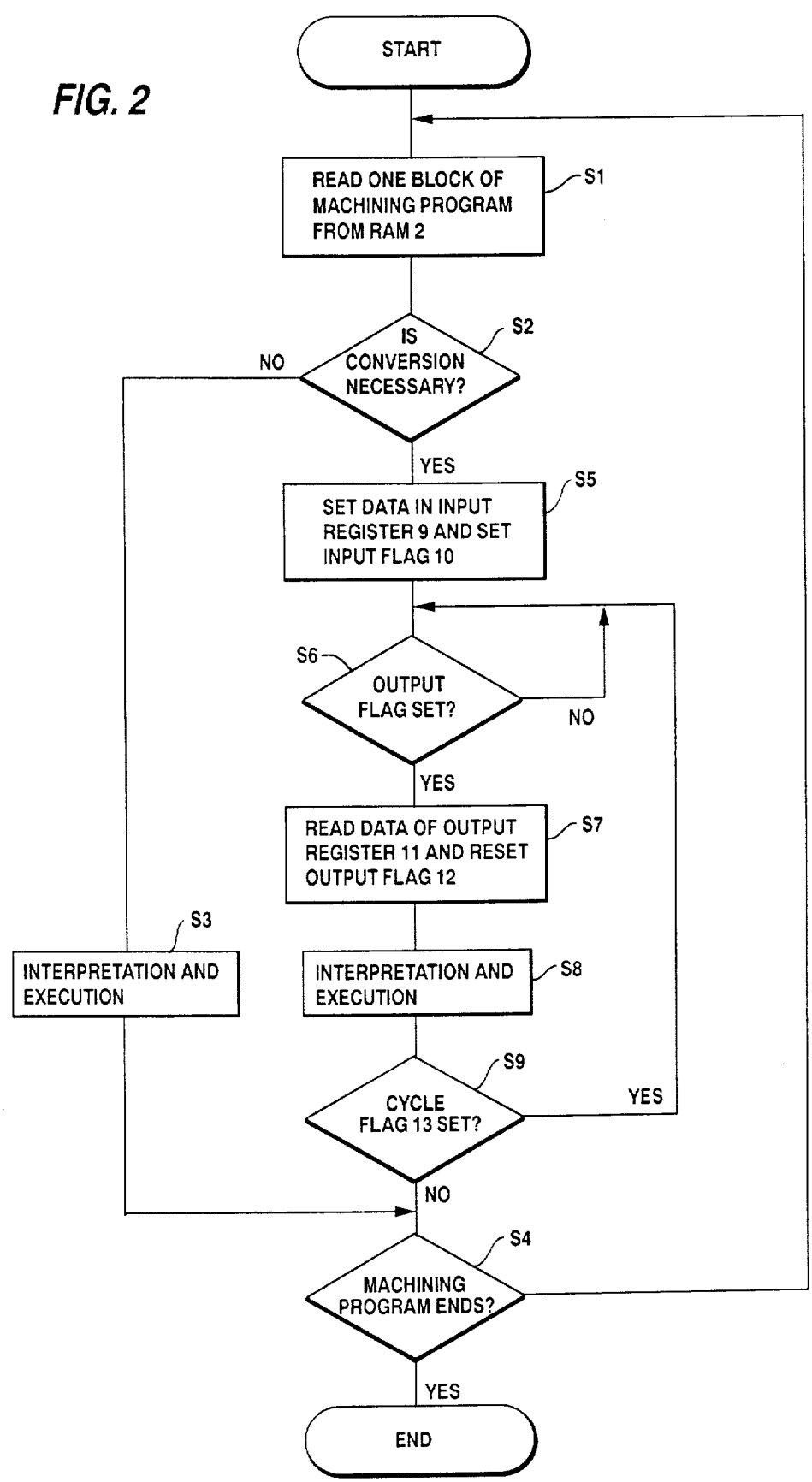
FIG. 2 is a flowchart for showing an example of processing which is performed by an NC processor 3.

As shown in FIG. 2, the NC processor 3 reads out, block by block, the machining program from the RAM 2, identifies the contents of the read-out block and, when deciding that no format conversion is necessary, interprets and executes the block (S2, S3). When format conversion is necessary, it sets the read-out block in the input register 9 and sets the input flag 10 (S5). Since a code used for the block of the macro instruction which is to be format-converted in distinct from codes used for blocks which need not be converted, the decision in step S2 can be made by identifying the code of the block.

Figure 3:
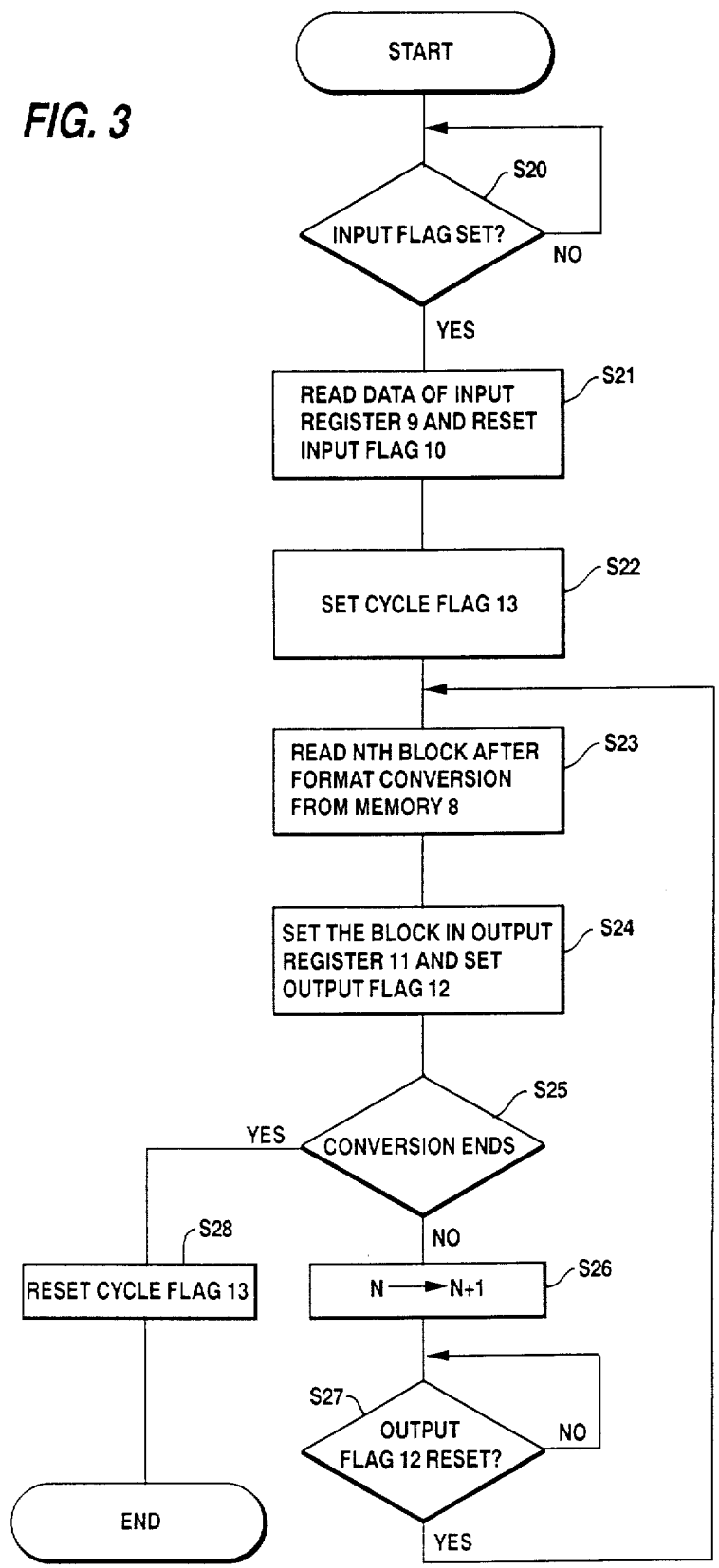
FIG. 3 is a flowchart showing an example of processing which is performed by a format converting processor 6.

As shown in FIG. 3, when detecting the setting of the input flag 10 (S20), the processor 6 for format conversion reads out the data of the input register 9 and resets the input flag 10 (S21). Further, it sets the in-cycle flag 13 (S22). Next, the processor reads out the leading one of a series of blocks stored in the magnetic bubble memory 8 corresponding to the read-out data (S23), sets it in the output register 11 and sets the output flag 12, notifying the NC program 3 of the data setting in the output register 11.

When the output flag 12 is set after sending data to the interface side, the NC processor 3 reads out the contents of the output register and resets the output flag 12 (S6, S7). Then it interprets nd executes the read-out data (data of one block) (S8).

The processor 6 for format conversion checks whether the conversion is finished or not (S25), and if not, it counts up the value of a pointer by one and, when the output flag 12 is reset, reads out data of one block of the next micro instruction from the memory 8, sets it in the output register 11 and sets the output flag 12 (S7, S23, S24). When the conversion is finished, that is, when the sending of a series of blocks is completed, the processor resets the in-cycle flag 13 (S28).

The NC processor 3 repeats the operations of steps S6 to S8 while the in-cycle flag 13 is set, and when the in-cycle flag 13 is reset, that is, when the conversion is finished, it returns to step S1 to process the next machining block (S4) except when the machining program has already been completed.

For example, in the case where three blocks for performing a tool exchange, such as

G00G90X100000Y200000Z100000;
T12;
X0Y0Z0 are made programmable using a single block

M06;

prestoring of the three blocks in the magnetic bubble memory 8 corresponding to the code M06 makes it possible to execute them simply by incorporating the command M06; in the machining program of the RAM 2. When the contents of the three blocks change as a result of a difference in the type of the machine tool used, it is necessary only to rewrite the contents of the magnetic bubble memory 8. That is, the function can easily be changed without involving any changes to the unified specifications of the NC side.

As described above, the present invention controls the conversion of a macro instruction to micro instructions apart from an NC processor through use of a format converting interface unit which comprises a receiving circuit for receiving the macro instruction delivered from the NC processor, which interprets and executes an NC cutting program, format converting means for converting the macro instruction to a series of micro instructions and a transmitting circuit for transmitting the series of micro instructions obtained by the conversion to the NC processor. Therefore, a change in the contents of a conversion program can be dealt with simply by modifying the constitution of the format converting means, specifically, the stored contents of the magnetic bubble memory 8, making it possible to add various functions without changing unified specifications of the NC processor side. Accordingly, the present invention offers the advantages that a numerical controller maker can cut the cost of the equipment by the unification of its specifications and that a machine tool maker can easily adopt their own contents of conversion and hence can present their unique feature.

What is claimed is:

1. A format conversion interface unit adapted for connection to numerical control equipment which numerically controls a machine tool by interpreting and executing an NC cutting program through use of an operation function of an NC processor, comprising:

a receiving circuit, coupled to the NC processor, for receiving a macro instruction delivered from the NC processor;

format converting means, separate from the NC processor, for converting the macro instruction received by said receiving circuit into a series of micro instructions in accordance with a conversion program stored in said format converting means, so that the NC cutting program can be used to cause said format converting means to generate different micro instructions by rewriting only the conversion program stored in said format converting means; and a transmitting circuit, coupled to the NC processor and said format converting means, for transmitting the series of micro instructions obtained by said format converting means to the NC processor.

2. A format conversion interface unit adapted for connection to numerical control equipment including an NC processor for controlling a machine tool under control of an NC program including macro instructions and NC program micro instructions, comprising:

receiving means for receiving a macro instruction from the NC processor;

format converting means, separate from the NC processor, for converting the macro instruction received by said receiving means into a series of converted micro instructions in accordance with a conversion program stored in said format converting means, so that the NC program can be used to cause said format converting means to generate different micro instructions by rewriting only the conversion program stored in said format converting means; and transmitting means for transmitting the series of converted micro instructions to the NC processor.

3. A format conversion interface unit as set forth in claim 2, wherein said format converting means comprises:

a memory, coupled to said transmitting means, for storing the conversion program which includes a correspondence between the macro instructions in the NC program and the converted micro instructions; and a format conversion processor, coupled to said memory and said receiving means, for receiving the macro instruction from said receiving means and for causing a corresponding series of converted micro instructions to be read from said memory to said transmitting means.

4. A format conversion interface unit as set forth in claim 3, wherein:

said receiving means comprises an input register coupled to the NC processor and said format conversion processor; and said transmitting means comprises an output register coupled to said memory and the NC processor.

5. A format conversion interface unit as set forth in claim 4, further comprising:

an input flag, coupled to the NC processor and said format conversion processor, for indicating when the NC processor has provided a macro instruction to said input register;

an output flag, coupled to the NC processor and said format conversion processor, for indicating when a series of converted micro instructions have been stored in said output register; and an in-cycle flag, coupled to the NC processor and said format conversion processor, for indicating when said format conversion processor is performing a format conversion process.

6. A format conversion interface unit as set forth in claim 5, wherein said memory comprises a magnetic bubble memory.

* * * * *

UNITED STATES PATENT AND TRADEMARK OFFICE
CERTIFICATE OF CORRECTION

PATENT NO. :  4,827,446
DATED      :  MAY 2, 1989
INVENTOR(S) : HIDEAKI KAWAMURA ET AL.

It is certified that error appears in the above-identified patent and that said Letters Patent is hereby corrected as shown below:

Col. 2, line 41, "in" should be --is--;

line 58, "nd" should be --and--;

line 65, "(S7," shoud be --(S27,--.

Signed and Sealed this

Second Day of January, 1990

Attest:

JEFFREY M. SAMUELS

Attesting Officer    Acting Commissioner of Patents and Trademarks